April 23, 1946. R. S. TAYLOR 2,398,814
SPEED CHANGE SYSTEM
Filed Aug. 25, 1942 6 Sheets-Sheet 1
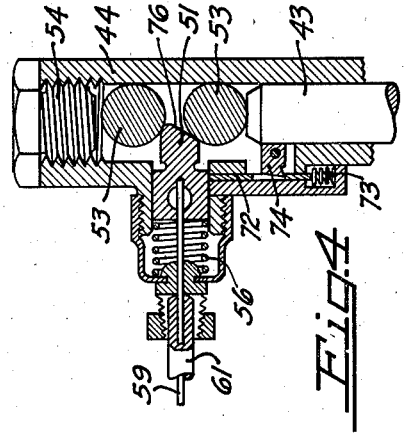
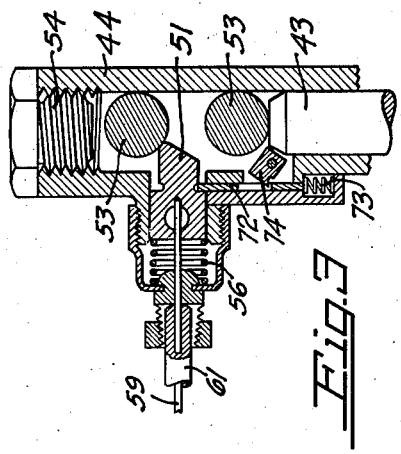
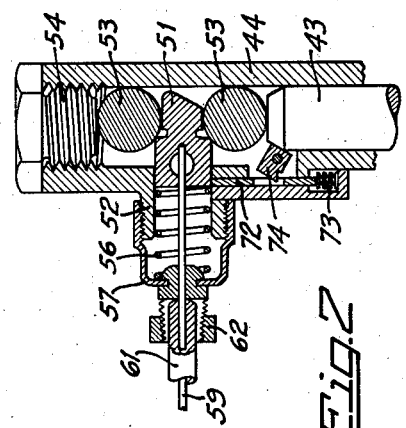
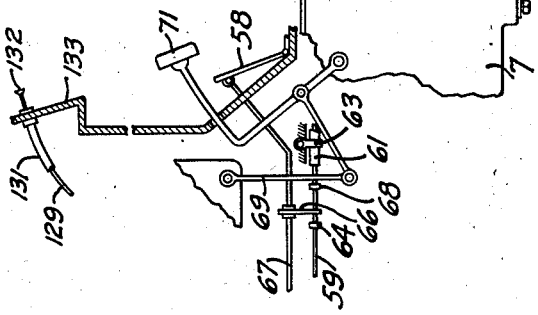
INVENTOR
ROBERT S. TAYLOR
BY *Charles D. Evans*
HIS ATTORNEY

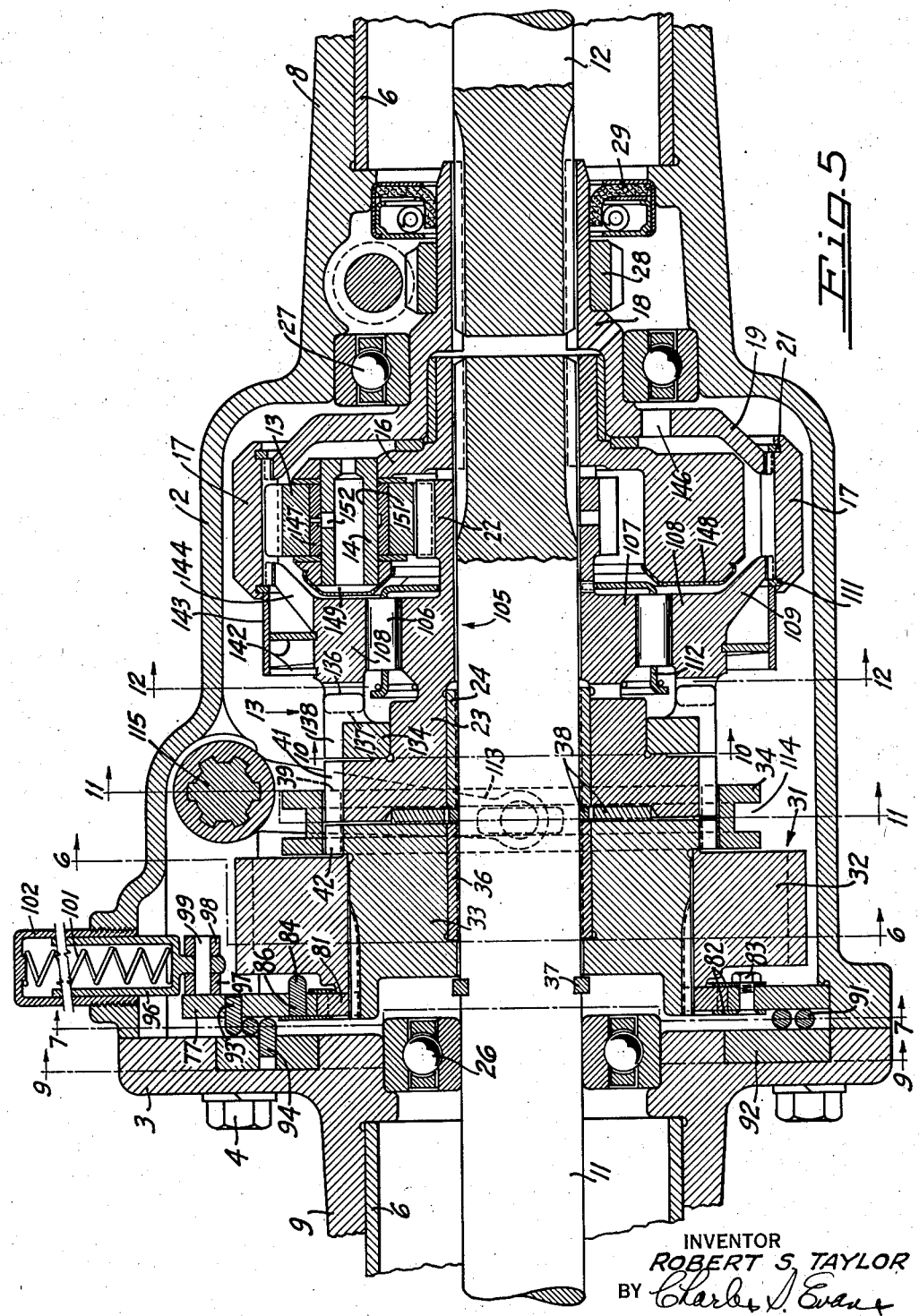

April 23, 1946.   R. S. TAYLOR   2,398,814
SPEED CHANGE SYSTEM
Filed Aug. 25, 1942   6 Sheets-Sheet 3

INVENTOR
ROBERT S. TAYLOR
BY Charles A. Evans
HIS ATTORNEY

April 23, 1946. R. S. TAYLOR 2,398,814
SPEED CHANGE SYSTEM
Filed Aug. 25, 1942 6 Sheets-Sheet 4
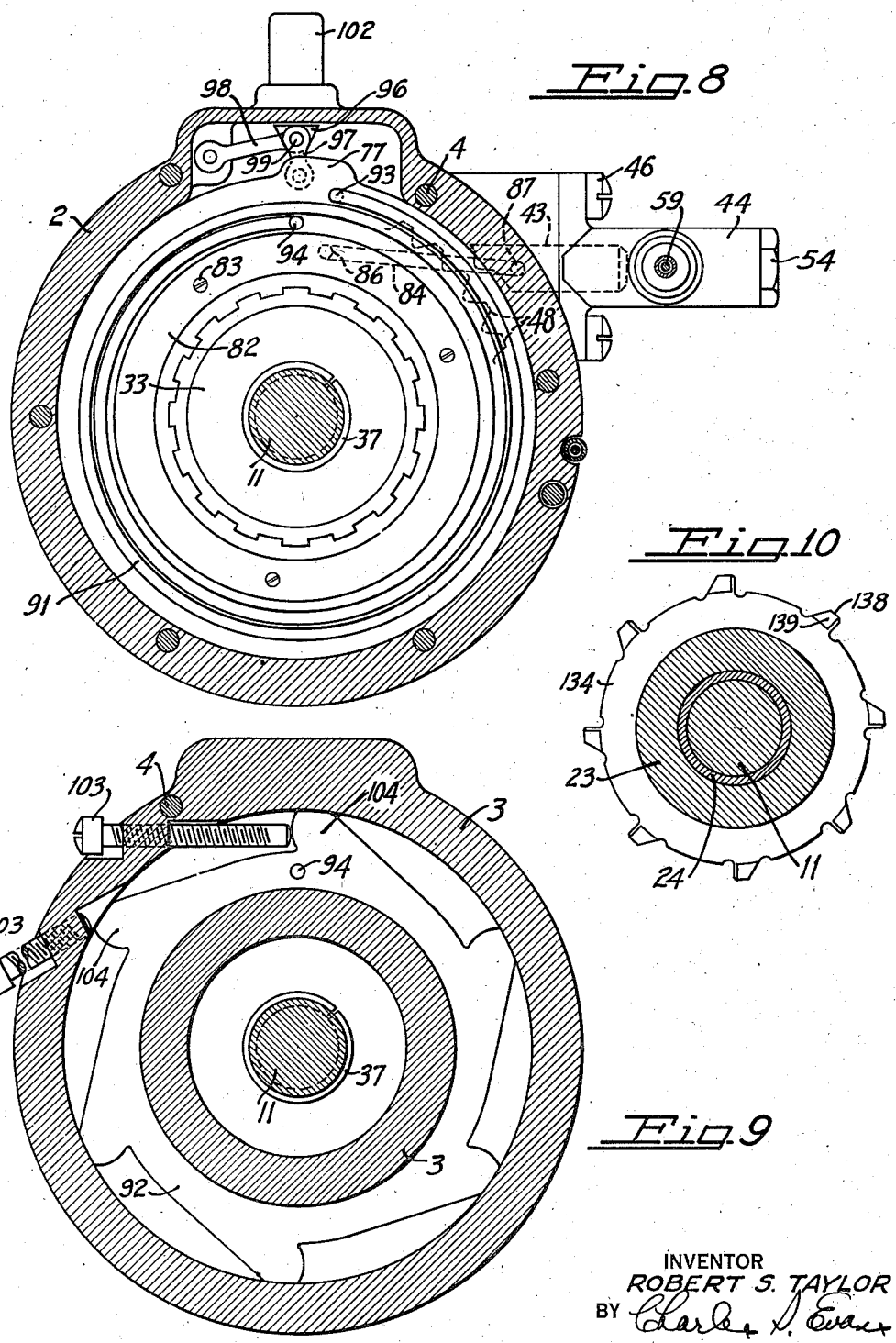
INVENTOR
ROBERT S. TAYLOR
BY
HIS ATTORNEY

OVERDRIVE

CHANGE FROM OVERDRIVE TO DIRECT (DRIVING LOAD)

DIRECT DRIVE

CHANGE FROM DIRECT TO OVERDRIVE (COASTING LOAD)

INVENTOR
ROBERT S. TAYLOR
BY Charles J. Evans
HIS ATTORNEY

Patented Apr. 23, 1946

2,398,814

UNITED STATES PATENT OFFICE 2,398,814

SPEED CHANGE SYSTEM

Robert S. Taylor, Seattle, Wash.

Application August 25, 1942, Serial No. 456,299

14 Claims. (Cl. 74—290)

My invention relates to mechanism for changing speed ratios in vehicles; and more particularly to an auxiliary overdrive transmission for automobiles.

It is among the objects of my invention to provide an overdrive transmission embodying automatic means for changing between overdrive and direct drive in response to rotational and torque conditions in the unit, together with means associated with a control element, such as the throttle, for modifying the automatic operation to allow the unit to change back into overdrive at such times when eliminating the overdrive is desirable from the standpoint of engine performance.

Another object is to provide improved brake means for holding a part of the gearing against rotation to establish the overdrive ratio.

Another object includes the provision of improved means for locking the unit in overdrive.

A further object is to provide an improved synchro-mesh clutch for connecting parts of the gearing together for direct drive.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawings:

Figure 1 is a side view, partly in section and partly in elevation, showing my auxiliary transmission interposed in the torque tube of an automobile, and showing portions of the clutch pedal and throttle mechanisms which enter into the control of my unit.

Figures 2, 3 and 4 are horizontal sectional views of the lock mechanism, taken in a plane indicated by line 2—2 of Figure 1. These views are on considerably larger scale than Figure 1; and show the parts in various operative positions.

Figure 5 is an axial sectional view of my transmission.

Figures 7 and 8 are transverse sectional views, taken in a plane indicated by line 7—7 of Figure 5, showing the overdrive brake and its operating mechanism; these views illustrating the parts in two different operative positions.

Figure 9 is a transverse sectional view, taken in a plane indicated by line 9—9 of Figure 5, showing the spring adjusting device for the brake.

Figure 10 is a detail sectional view showing the floating member of the synchro-mesh clutch.

Figure 6:
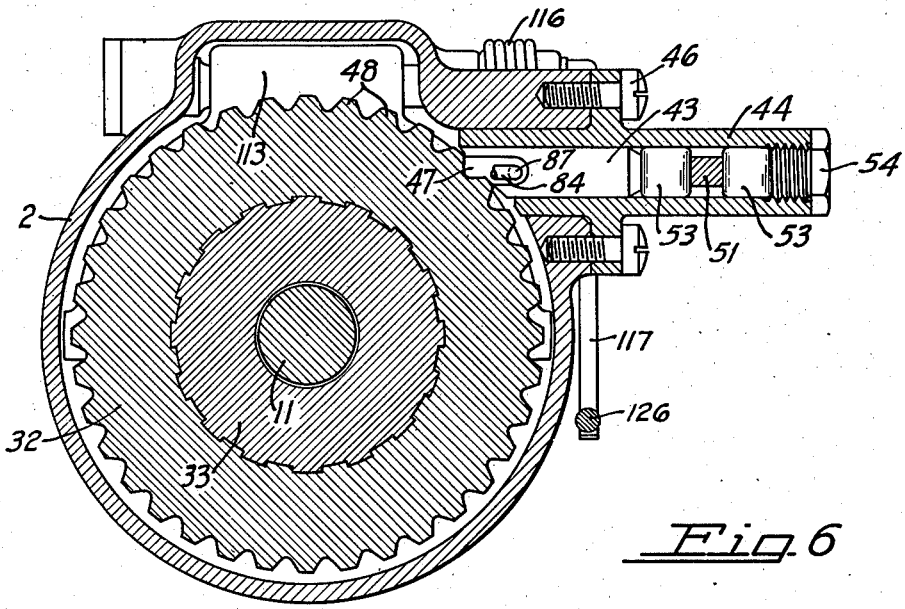
Figure 6 is a transverse sectional view, taken in a plane indicated by line 6—6 of Figure 5, showing the overdrive brake and lock mechanism.

In terms of broad inclusion, my speed change transmission comprises a gearing embodying torque means for automatically changing between overdrive and direct drive; and means associated with the regular clutch and/or throttle mechanisms for modifying automatic operation of the unit. The gearing employed in my transmission is preferably a planetary system; and the overdrive ratio is established by an improved brake and lock mechanism for holding a part of the gearing against rotation. An improved synchro-mesh clutch is also provided for connecting parts of the gearing together for direct drive.

In greater detail, and referring to Figure 1 of the drawings, the speed change system of my invention, as embodied in an auxiliary overdrive transmission, comprises a housing having a body portion 2 and end plate 3 secured together by screws 4. The housing is preferably interposed in torque tube 6 of an automobile behind the regular transmission 7, with sections of the tube engaged by necks 8 and 9 on the housing body and end plate respectively. Leading portion 11 of the propeller shaft provides the drive shaft of my unit, and trailing portion 12 forms the driven shaft. When power is being transmitted through the unit from drive shaft 11 to driven shaft 12 the mechanism is subjected to a certain kind of loading which I shall refer to as a "driving load"; and when the rear wheels of the car tend to overrun the rate at which they are driven the mechanism is subjected to a different loading which I term "coasting load"; these terms being conventional in the trade.

As shown in Figure 5, the overdrive transmission chosen for purposes of illustration comprises a planetary gearing having a planet pinion 13 journaled on shaft 14 mounted on a pinion carrier 16 splined to drive shaft 11. Orbit gear 17 of the planetary system is mounted for rotation with driven shaft 12 by a hub 18 splined to the shaft and provided with a flange 19 peripherally splined to the orbit gear and held by retaining ring 21. Sun gear 22 is formed as part of a sleeve 23 freely journaled on the drive shaft on a bearing 24.

The entire mechanism is journaled in the housing by two main bearings 26 and 27. One of these is disposed about the drive shaft and is retained by end plate 3, while the other is interposed between hub 18 and neck 8 of the main housing. Hub 18 also carries speedometer gear 28; and an oil retaining ring 29 is interposed between the hub and neck behind gear 28.

Means are provided for holding the sun gear against rotation to effect planetary operation of the system for establishing an overdrive connection between the shafts. For this purpose a brake mechanism generally indicated by reference numeral 31 is employed; the brake being engaged by reverse (counter-clockwise) torque of the sun gear under coasting load, and disengaged by forward (clockwise) torque of the sun gear under driving load. In the present specification the references to direction of rotation and torque (clockwise and counter-clockwise) are taken as viewed from the left in Figure 5; the clockwise rotation being considered as forward in the conventional manner.

Brake 31 for establishing the overdrive connection comprises a peripherally toothed rotor 32 splined to a hub 33 connectable to sun gear sleeve 23 through a shiftable clutch member 34. Hub 33 is freely journaled on drive shaft 11 by bearing 36 and is restrained axially by retaining ring 37 and spacer bearings 38. By this arrangement the brake rotor 32 is connected with the sun gear whenever clutch member 34 is in the position shown in Figure 5 with its teeth 39 engaging teeth 41 and 42 respectively of the sleeve and hub.

Figure 7:
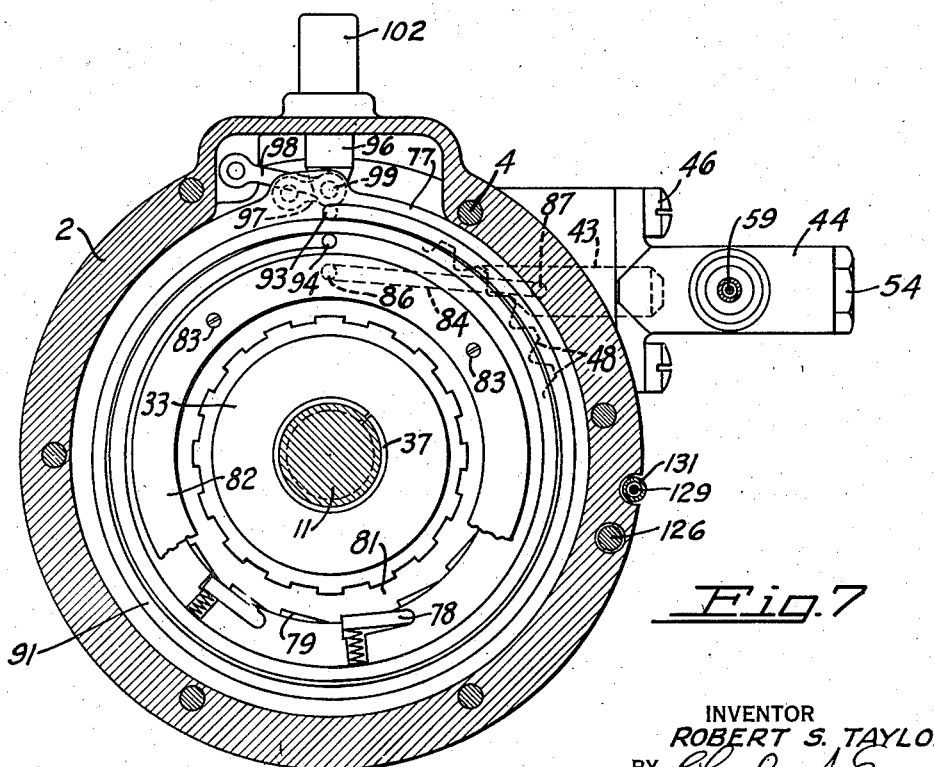

Referring to Figure 6, the overdrive brake further comprises a bar 43 disposed transversely of and offset from the rotor axis, and axially slidable in a tubular casing 44 secured to the housing by screws 46. Brake bar 43 has a forward end 47 shaped to fit in the V-shaped notch formed between teeth 48 on rotor 32. In its extended position the brake bar engages the toothed rotor as shown in Figures 6 and 7; and in its retracted position the bar is disengaged from the rotor as illustrated in Figure 8. It is apparent that the brake bar is disengageable by axial thrust applied on it by rotor 32 when the latter tends to turn clockwise under torque imposed by the sun gear when the unit is subjected to driving load.

Means are therefore provided for locking the brake bar against disengagement to maintain the overdrive connection. When the brake is locked up, the sun gear is thus held against clockwise rotation, and the driving thrust is transmitted by drive shaft 11 to orbit gear 17 through planet pinion 13 which in turn planetates about the fixed sun gear. The orbit gear thus rotates forwardly at a faster rate than the drive shaft, and this is reflected by increased speed of driven shaft 12 in accordance with the usual planetary overdrive principle.

As illustrated in Figures 2 and 6, the locking means comprises a plunger 51 slidable within a transverse neck portion 52 of casing 44. When the plunger is extended it lies between a pair of rollers 53 interposed between the end of brake bar 43 and a fixed reactor element or plug 54 threaded in the end of casing 44. In other words, when plunger 51 is inserted between the rollers, the overdrive brake is locked against disengagement. The locking plunger is normally urged toward extended position by a spring 56 interposed between the plunger and a cap 57 threaded on neck 52.

Means associated with the throttle pedal 58 (Figure 1) is provided for retracting lock plunger 51 to permit disengagement of the overdrive brake. A pull wire 59 attached to the plunger is carried forward in a protective sheath 61 secured at its rear end to cap 57 by a clamp 62 and terminating under the driver's compartment at a clamp 63. The forwardly projecting end of wire 59 carries a stop 64 engageable by an arm 66 on the throttle rod 67. Stop 64 is normally spaced ahead of arm 66 so wire 59 is pulled to start retraction of plunger 51 at the end of the throttle stroke when pedal 58 is fully depressed. Rollers 53 permit the plunger to be pulled out easily against the axial thrust imposed on brake bar 43 by the sun gear torque. The normal operation of the throttle pedal is not interfered with as the plunger need be retracted by the throttle only just enough to allow a roller 53 to move under the inclined face of the plunger, whereupon the axial thrust of bar 43 lifts the plunger to the partially retracted position shown in Figure 4. With the brake thus disengaged, the unit is free to go into direct drive.

Means are also preferably provided to unlock the brake to permit disengagement thereof when the regular clutch pedal 71 is depressed to slow up the car or shift gears. Another stop 68 is preferably arranged on wire 59 to be engaged by a suitable linkage 69 connected to the clutch pedal 71, so that plunger 51 of my unit is fully retracted when the clutch pedal is depressed. Means are also provided for latching plunger 51 in the fully retracted position. As seen in Figure 3, a latch plate 72 is pressed forwardly under a shoulder of the plunger by a spring 73, thus holding the plunger retracted even though the clutch pedal has moved back. The brake bar 43 is now free to retract whenever a clockwise torque is put on the brake rotor by the sun gear, so that the unit can go into direct drive.

Upon retraction of brake bar 43 it kicks over a pivoted finger 74 to disengage latch plate 72 and allow spring pressed plunger 51 to rest on one of rollers 53 as shown in Figure 4. The plunger with its tapered nose 76 is now ready for reinsertion between the rollers whenever the brake bar is again extended.

Means are provided for extending bar 43 to reengage brake rotor 32 when the latter turns counter-clockwise under reverse torque of the sun gear occasioned by a coasting load on the unit. As illustrated in Figures 5, 7 and 8, an annular plate 77 is connected for counter-clockwise turning with rotor 32 by spring pressed ratchets 78 mounted on the inner periphery of the plate and engaging ratchet teeth 79 formed on a ring 81 splined to rotor hub 33. Retainer rings 82 secured on opposite sides of plate 77 by bolts 83 serve to hold the parts together.

Plate 77 is in turn connected to brake bar 43 by a link 84. This link lies between the plate and rotor as seen in Figure 5, and preferably comprises a rod having outturned ends 86 and 87 to form pivotal engagements with the plate and brake bar respectively. In order to make room for the link alongside bar 43, a side of the latter is preferably flattened or cut away as shown in Figure 6. Figure 8 illustrates the position of the parts when the brake bar is disengaged; and Figure 7 shows the relationship after plate 77 has turned counter-clockwise to pull the brake bar back into engagement with rotor 32.

Means are further provided to insure full engagement and disengagement of brake bar 43. In the preferred construction a tangent spring 91 is interposed between brake actuating plate 77 and an anchor plate 92 mounted on end plate 3 of the housing. This spring has outturned ends 93 and 94 for engaging plates 77 and 92 respectively. In the brake engaged position of the parts as shown in Figure 7 the tangent spring exerts a force of about 33 lbs. clockwise on plate 77; and in the brake disengaged position the spring force is about 30 lbs. clockwise.

Opposing this force is a spring pressed toggle device comprising a slidable arm 96 pivotally connected to plate 77 by a short link 97, so that the link moves between the collapsed position of Figure 7 and the extended position of Figure 8. A guide arm 98 is connected between the housing and elbow pin 99 of the toggle; there being sufficient play at the joint to allow for the straight line motion of arm 96. Figure 5 shows that arm 96 is tubular in form to receive spring 101 which is interposed between the arm and a thimble 102 in which the arm is slidably mounted. In the brake engaged position, spring 101 acting on the full lever arm of link 97 exerts a force of about 36 lbs. counter-clockwise, thus providing a resultant counter-clockwise force of about 3 lbs. tending to hold the brake bar engaged.

In the disengaged position shown in Figure 8 the extended link 97 is about 1½ degrees over center, imparting a force of about 1½ lbs. clockwise and acting with tangent spring 91 to produce a resultant of about 31½ lbs. clockwise tending to hold the brake bar disengaged. Thus, at the beginning of the brake engaging operation, a counter-clockwise turn of less than 2 degrees throws the toggle link over center, and thereafter the toggle device acts with increasing force against the tangent spring (thus reducing the applied effort required to engage the brake) until finally the tangent spring force is overcome by the toggle mechanism. This arrangement insures that any torque sufficient to start the brake engaging movement is enough to complete it.

Means are provided for adjusting the tension of tangent spring 91. Referring to Figure 9, a pair of adjusting screws 103 are provided on end plate 3 of the housing to engage ears 104 on the periphery of anchor plate 92. These parts are so arranged that by alternately turning up and backing off the screws the anchor plate may be turned any required amount, depending upon the spring tension desired.

Figure 12:
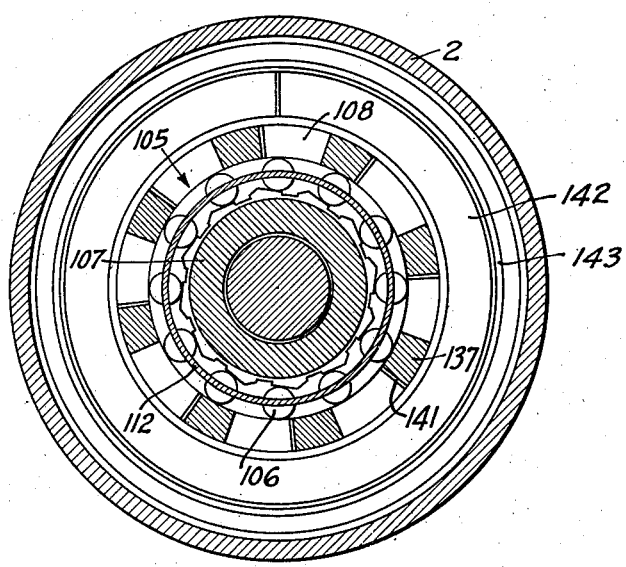
Figure 12 is a transverse sectional view, taken in a plane indicated by line 11—11 of Figure 5, illustrating the one-way clutch.

From the preceding description of the brake mechanism it is apparent that with the brake unlocked it will disengage to release the sun gear under the torque conditions imposed by a driving load. In order to establish a direct drive connection upon release of the sun gear, means are provided for locking the parts of the planetary gearing together for rotation as a unit. As shown in Figures 5 and 12, a one-way clutch generally designated by reference numeral 105 is interposed between the sun and orbit gears. This direct drive clutch comprises rollers 106 working between an inner clutch ring 107 formed on sun gear sleeve 23, and an outer clutch ring 108 having a flange 109 peripherally splined to an end of the orbit gear and held by retaining ring 111. The clutch rollers are held by a suitable spring pressed cage 112, and coact with flats on the inner clutch ring 107 to connect the sun and orbit gears together when the sun gear tends to run clockwise at a rate faster than the orbit gear.

The one-way clutch thus functions to lock up the planetary gearing as soon as the sun gear is released by overdrive brake 31, because a driving load on the unit tends to spin the sun gear clockwise. Shock of clutch engagement is avoided by the inertia of brake rotor 32 and the connected parts which function as a fly wheel to prevent the released sun gear from accelerating too rapidly. With this inertia load to overcome, the sun gear gradually comes up to the speed of the orbit gear, whereupon the one-way clutch engages smoothly and without clash.

Means are still further provided for shifting the slidable clutch member 34 to positively lock the parts of the planetary gearing together for direct drive. When member 34 is in the left hand position shown in Figure 5, the sun gear is connected with the overdrive brake as has already been described. By shifting the member toward the right the brake mechanism is cut out and positive connection is established between the sun and orbit gears. Shifting is accomplished by a yoke 113 engaging an annular groove 114 in member 34. The yoke is splined to a shaft 115 journaled in the housing. A spring 116, Figure 11, interposed between the shaft and housing normally urges clutch member 34 toward the left.

Referring now to Figure 1, the external part of the yoke shifting means comprises a lever 117 secured to shaft 115. A second lever 118 is pivoted to the housing on a pin 119, and is connected to lever 117 by the link 122, pivoted to lever 118 by the pin 121.

In the position of the linkage shown in Figure 1, clutch member 34 is toward the left as illustrated in Figure 5, thus rendering the overdrive brake effective. But when the lower end of lever 118 is pulled forward or the lower end of lever 117 is pushed back, clutch member 34 is shifted to the right to cut out the overdrive brake and establish the direct drive connection. During this operation of the linkage, link 122 swings down over the center of pivot 119 until a lip 123 on the link engages an edge of lever 118, thus locking clutch member 34 in its right hand position. The parts will be held in the direct drive position until lever 118 is swung back to move link 122 over center and allow spring 116 to shift clutch member 34 forward again. A U-shaped spring 124, interposed between pin 121, and pin 125 on the housing is compressed as link 122 passes over its center position, and functions to snap the linkage from one position to the other.

A slidable rod 126 bearing against lever 117 is connected at its forward end to an arm 127 fixed to a projecting part 128 of the reverse shifting bar in regular transmission 7. By this arrangement my unit is shifted into direct drive whenever the regular transmission is put in reverse gear. Since the direct drive connection established by clutch member 34 is a positive one, the reverse torque is readily transmitted through the unit.

A control wire 129 is connected with lever 118 and extends forwardly through a sheath 131 to a suitable operating button 132 on the dash board 133. By pulling this wire the unit may be manually shifted into direct drive at any time. Furthermore, pushing on the wire 129 serves to swing lever 118 back to move link 122 over center and thereby reestablish the overdrive brake connection. This latter manipulation also allows the driver to reestablish connection with the overdrive brake after the unit has been put in direct drive by a reverse shift of the regular transmission.

Figure 13:
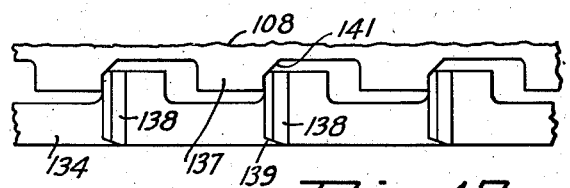
Figure 13 is a fragmentary view taken in the direction of arrow 13 of Figure 5, showing portions of the floating clutch member and orbit gear connection. In this view the normally curved surfaces of the parts are flattened out into a plane to illustrate the structure more clearly.

The means for positively connecting the sun and orbit gears together when clutch member 34 is shifted to the right includes a synchro-mesh feature. As shown in Figure 5, a floating clutch ring 134 is interposed between sun gear sleeve 23 and orbit gear part 108. This floating ring is freely journaled on the sun gear sleeve and is connected for limited turning movement relative to part 108 by end teeth 136 on ring 134 loosely meshed with teeth 137 on part 108 respectively. Figure 13 clearly shows the free play between these teeth which allows for the desired relative movement.

Figure 11:
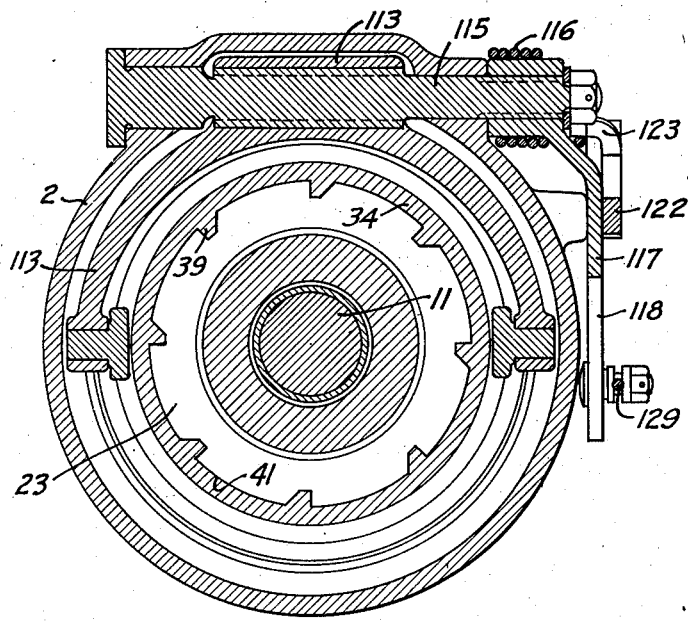
Figure 11 is a transverse sectional view of the clutch shifting mechanism, taken in a plane indicated by line 10—10 of Figure 5.

Floating ring 134 also has peripheral teeth 138 adapted to be engaged by the internal teeth 39 on clutch member 34 when the latter is shifted to the right. As seen in Figures 10 and 11, teeth 39 and 138 are relatively narrow and are widely spaced circumferentially. This wide spacing will insure meshing of the teeth in most positions of the sun and orbit gears. The adjacent ends of teeth 39 and 138 are also beveled as indicated by bevels 139 on teeth 138 in Figures 10 and 13. Should the teeth meet end on, these bevels usually will force the floating ring to turn enough to permit meshing; it being remembered that the floating ring is free to turn a limited degree relative to the shiftable member because of the loose connection with part 108.

The only other condition to take care of is the exceptional one where the narrow flat end faces of teeth 39 and 138 happen to abut squarely. Therefore I provide inclined planes 141 at the bases of teeth 137 on part 108, adapted to turn floating ring 134 upon axial pressure applied to the floating ring by shiftable member 34. See Figure 13. This turning is enough to move the flat ends of the teeth out of abutment and permit meshing thereof.

Lubrication of my unit is preferably by means of oil retained in the lower portion of the housing. Oiling of the confined parts of the planetary gearing is insured by a helical impeller or screw 142 disposed between the periphery of part 108 and a hollow casing 143. This pump picks up oil from the housing and delivers it under pressure to the planetary gearing through an opening 144 in flange 109. The oil is then discharged back into the housing through an opening 146 in flange 19. Part of the oil is fed under further pressure to the planet pinion bearing 147 by a scoop ring 148 secured to the planet pinion carrier 16 and having a raised lip portion adjacent the pinion shaft to provide an opening 149 for scooping the oil and directing it into longitudinal passage 151 of the pinion shaft. A transverse passage 152 in the shaft leads to the pinion bearing.

Figure 14:
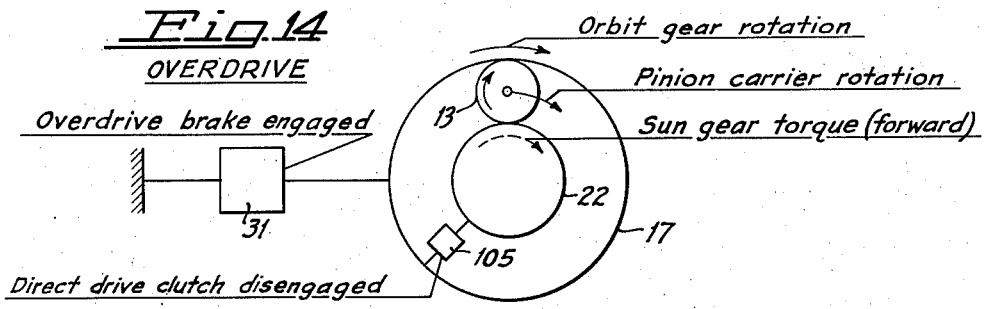
Figures 14 to 17 are diagrammatic views showing the rotational and torque conditions in the planetary gearing at various stages of operation.
Figure 17:
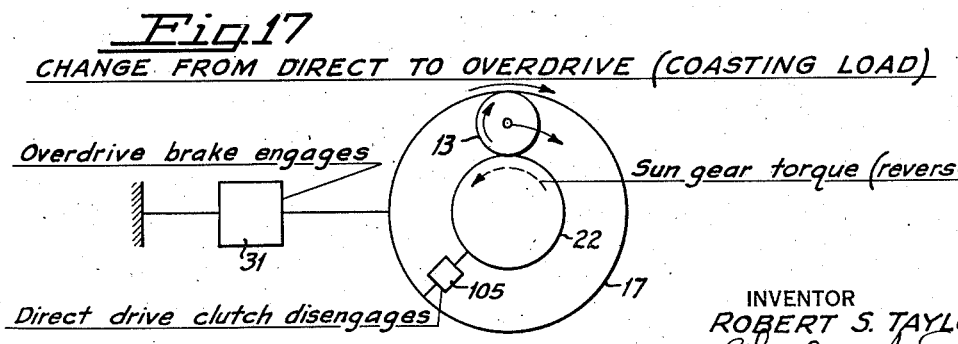

*Operation.*—With the structure hereinbefore described in mind, and with particular reference to Figures 70 to 17, the operation of my unit is as follows: Consider that the shiftable clutch member 34 is positioned as in Figure 5 to render the overdrive brake active, and also consider that the brake is engaged as in Figure 6 with locking plunger 51 inserted as in Figure 2. The unit is now locked up in overdrive, and the directions of rotation and torque in the planetary system are illustrated in Figure 14. Under driving load the torque on the sun gear is forward and this thrust is taken by locked brake bar 43. Pinion 13 planetates about the fixed sun gear and drives orbit gear 17 forward at a faster rate than the drive shaft, producing the overdrive ratio. At this time the direct drive clutch 105 is disengaged because the orbit is overrunning the sun gear clockwise.

Figure 15:
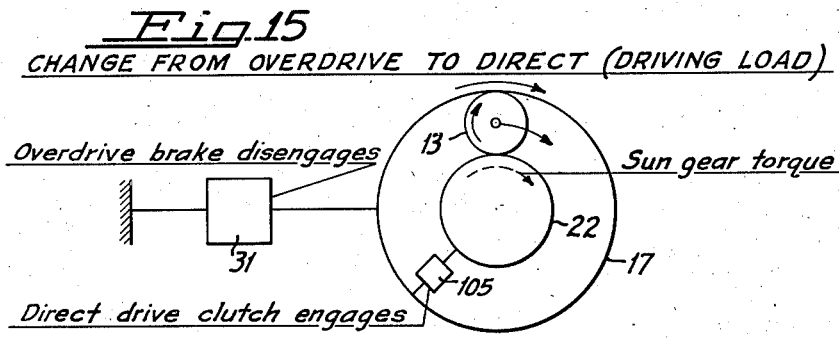
Figure 16:
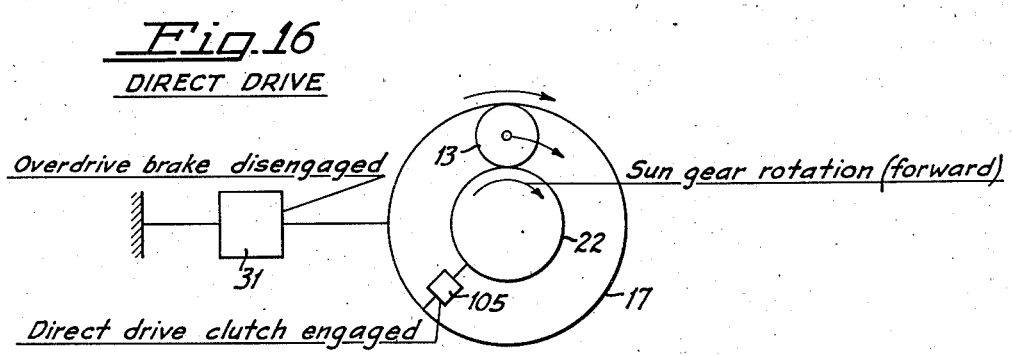

Let us suppose now that the driver fully depresses the throttle pedal 58 or depresses clutch pedal 71. In either case locking plunger 51 is withdrawn, and if withdrawn by the clutch pedal it is latched out by plate 72. Forward torque of sun gear 22 under driving load as shown in Figure 15 then retracts bar 43 to disengage the brake and release the sun gear. One-way clutch 105 immediately locks the sun and orbit gears together so that the gearing rotates as a unit to produce the direct drive ratio. If the lock plunger 51 was latched out, retraction of brake bar 43 unlatches the plunger, and the latter seats on a roller 53 ready for reinsertion between the rollers when the brake bar is again extended. In the direct drive connection as illustrated in Figure 16, the sun gear rotates forwardly (clockwise) along with the other gears. Brake rotor 32 also runs forward, which it is free to do because brake bar 43 is held disengaged by tangent spring 91. Ratchets 78 are of course disposed to allow free clockwise rotation of the brake rotor.

The unit remains in direct drive as long as there is a driving load on the unit. However, when the momentum of the car puts a coasting load on the unit, orbit gear 17 tends to rotate clockwise faster than the rate at which it is driven from the engine. This causes planet pinion 13 to start turning clockwise about its own axis, causing a reversal of torque on the sun gear and tending to turn the latter and the connected brake rotor backwards (counter-clockwise) as illustrated in Figure 17. As a result, plate 77 is turned backward through ratchets 78, thus pulling brake bar 43 into engagement with the toothed rotor. When the sun gear is stopped by the brake, pinion 13 is forced to planetate about it and reestablish the overdrive connection between the shafts. Immediately upon extension of brake bar 43, plunger 51 reinserts itself between rollers 53 to relock the brake against disengagement.

In the operation of my improved overdrive transmission it will be noted that the torque operated brake for holding the sun gear is under the control of the driver by reason of the connections with the regular throttle and clutch mechanisms, whereby the unit changes back into direct drive at such times when eliminating the higher gear ratio is desirable from the standpoint of engine performance. Thus, when greater acceleration is desired to pass another vehicle, or greater power is required to make a grade, the driver needs only to depress the throttle pedal fully to cut out the overdrive. My mechanism also insures adequate starting torque in any of the forward gear ratios of the regular transmission because the overdrive is cut out whenever the regular clutch pedal is depressed in starting the car or shifting gears.

The mechanism also enables a reverse torque to be transmitted through my unit for backing the car, because the planetary gearing is positively locked together for direct drive whenever the regular transmission is shifted into reverse. Furthermore, the driver can cut out the overdrive at any time he desires by pulling the dash control button 132.

Another feature in the operation of my mechanism is that the unit functions as a hill-holder in overdrive. Should the car start rolling backwards the one-way clutch 105 will engage and put a counter-clockwise torque on the sun gear and connected brake rotor 32. As seen in Figure 5, brake bar 43 prevents rotor 32 from turning counter-clockwise because the thrust is taken transversely across the bar to the housing or fixed element. The sun gear being thus blocked, the rear wheels are positively locked against reverse rotation and backward rolling is prevented.

I claim:

1. In a speed change system, a gearing, a rotor, means for selectively connecting or disconnecting the rotor with the gearing, and a bar positively engageable with the rotor to hold a part of the gearing against rotation and movable along an axis spaced from and transverse to the axis of the rotor.

2. In a speed change system, a gearing, a rotor, means for selectively connecting or disconnecting the rotor with the gearing, a bar positively engageable with the rotor to hold a part of the gearing against rotation, and means for mounting the bar to disengage under thrust of the rotor for releasing said part.

3. In a speed change system, a gearing, a rotor connected with the gearing, a bar positively engageable with the rotor to hold a part of the gearing against rotation, means for mounting the bar to disengage under thrust of the rotor for releasing said part, and means for locking the bar against disengagement.

4. In a speed change system, a gearing, a rotor connected with the gearing, a bar positively engageable with the rotor to hold a part of the gearing against rotation, means for mounting the bar to disengage under thrust of the rotor for releasing said part, means for locking the bar against disengagement, and means for controlling the locking means.

5. In a speed change system, a gearing, a rotor connected with the gearing, a bar positively engageable with the rotor to hold a part of the gearing against rotation, means for mounting the bar to disengage under thrust of the rotor for releasing said part, a plunger for locking the bar against disengagement, and means for retracting the plunger to unlock the bar.

6. In a speed change system, a gearing, a rotor connected with the gearing, a bar positively engageable with the rotor to hold a part of the gearing against rotation, means for mounting the bar to disengage under thrust of the rotor for releasing said part, a plunger for locking the bar against disengagement, means for retracting the plunger to unlock the bar, and means for latching the plunger in retracted position.

7. In a speed change system, a gearing, a rotor connected with the gearing, a bar positively engageable with the rotor to hold a part of the gearing against rotation, means for mounting the bar to disengage under thrust of the rotor for releasing said part, a fixed element, a pair of rollers interposed between the bar and fixed element, and a plunger insertable between the rollers for locking the bar against disengagement.

8. In a speed change system, a gearing, a rotor connected with the gearing, an elongated rod positively engageable with the rotor to hold a part of the gearing against rotation, means for mounting the rod, so as to be movable along its axis and to disengage under thrust of the rotor for releasing said part when the rotor turns in one direction, and means responsive to turning of the rotor in the opposite direction for engaging the rod with the rotor.

9. In a speed change system, a gearing, a rotor connected with the gearing, a bar positively engageable with the rotor to hold a part of the gearing against rotation, a turnable plate, a link connecting the bar and plate, and means connecting the plate and rotor to engage the bar with the rotor upon turning of the rotor.

10. In a speed change system, a gearing, a rotor connected with the gearing, a bar positively engageable with the rotor to hold a part of the gearing against rotation, means for mounting the bar to disengage under thrust of the rotor for releasing said part when the rotor turns in one direction, and means responsive to turning of the rotor in the opposite direction for engaging the bar with the rotor, and resilient means for urging the bar into either one or another of its operative positions.

11. In a speed change system, a planetary gearing including a sun gear, a rotor connected with the sun gear, a movable bar positively engageable with the rotor to hold the sun gear against rotation, means for mounting the bar to disengage under thrust of said rotor for releasing the sun gear, and means including a one-way clutch for locking parts of the planetary gearing together for rotation as a unit upon release of the sun gear.

12. In a speed change system, a planetary gearing including a sun gear, a rotor connected with the sun gear, a movable bar positively engageable with the rotor to hold the sun gear against rotation, means for mounting the bar to disengage under thrust of said rotor for releasing the sun gear, and means including a one-way clutch for locking parts of the planetary gearing together for rotation as a unit upon release of the sun gear, said rotor having sufficient inertia to retard acceleration of the sun gear after its release so that the clutch engages without shock.

13. In a speed change system, gearing including sun and orbit gears, a rotor, a bar positively engageable with the rotor to hold the rotor against rotation, means for mounting the bar to disengage under thrust of the rotor, and means for selectively connecting the rotor to the sun gear or the sun gear to the orbit gear.

14. In a speed change system, gearing including sun and orbit gears, a rotor, a bar positively engageable with the rotor to hold the rotor against rotation, means for mounting the bar to disengage under thrust of the rotor, a plunger for locking the bar against disengagement, means for retracting the plunger to unlock the bar, and means for selectively connecting the rotor to the sun gear or the sun gear to the orbit gear.

ROBERT S. TAYLOR.